United States Patent [19]

Heyman

[11] Patent Number: 4,536,557

[45] Date of Patent: Aug. 20, 1985

[54] POLYMER DISPERSIONS AND THEIR USES

[75] Inventor: Duane A. Heyman, Monroe, Mich.

[73] Assignee: BASF Wyandotte Corporation, Wyandotte, Mich.

[21] Appl. No.: 681,643

[22] Filed: Dec. 14, 1984

Related U.S. Application Data

[62] Division of Ser. No. 600,885, Apr. 16, 1984, Pat. No. 4,503,193.

[51] Int. Cl.$^3$ .................. C08G 18/08; C08G 18/16; C08G 18/18
[52] U.S. Cl. .................. 528/52; 521/128; 521/137; 525/131; 528/73; 528/75
[58] Field of Search ............... 525/131; 521/128, 137; 528/52, 73, 75

[56] References Cited

U.S. PATENT DOCUMENTS

| | | | |
|---|---|---|---|
| Re. 28,715 | 2/1976 | Stamberger | 525/131 |
| Re. 29,014 | 10/1976 | Pizzini et al. | 528/75 |
| Re. 29,118 | 1/1977 | Stamberger | 525/131 |
| 4,390,645 | 6/1983 | Hoffman et al. | 528/75 |

Primary Examiner—Joseph L. Schofer
Assistant Examiner—J. M. Reddick
Attorney, Agent, or Firm—Norbert M. Lisicki; David L. Hedden

[57] ABSTRACT

This invention relates to polymer dispersions prepared by the in situ polymerization of an ethylenically unsaturated monomer or mixture of monomers in a chain extender in the presence of a free radical polymerization initiator and a polyamide stabilizer.

The invention also relates to mixtures of the polymer dispersions with compounds having two or more active hydrogen atoms as determined by the Zerewittinoff method. These mixtures are used to prepare polyurethane products.

6 Claims, No Drawings

POLYMER DISPERSIONS AND THEIR USES

This is a division of application Ser. No. 600,885 filed Apr. 16, 1984, now U.S. Pat. No. 4,513,193.

BACKGROUND OF THE INVENTION

1. Field of the Invention

This invention relates to polymer dispersions and their uses. The dispersions are prepared by the in situ polymerization of an ethylenically unsaturated monomer in a chain extender in the presence of a free radical polymerization initiator and a polyamide having a pendent amide group. They are used to blend with active hydrogen-containing compounds to prepare polyurethane products.

2. Description of the Prior Art

One of the challenges faced by those working to improve products made from polyurethane polymers is to develop products which have acceptable mechanical properties, but which can be easily processed.

It is known that the mechanical properties of polyurethane products can be improved by the use of graft polymer dispersions such as those described in U.S. Pat. Nos. Re. 28,715 and 29,014. It is also known that the mechanical properties of polyurethane elastomers can be improved if chain extenders such as low molecular weight diols are added to the formulation. The chain extender is usually added to the graft polymer dispersion before reacting with the organic polyisocyanate. The problem with this approach is that the chain extender is often not compatible with the polyol and results in phase separation of the graft polymer dispersion and chain extender. Moreover, the resulting compositions often have an unacceptable viscosity which makes processing difficult.

SUMMARY OF THE INVENTION

This invention relates to polymer dispersions prepared by the in situ polymerization of an ethylenically unsaturated monomer or mixture of monomers in a chain extender in the presence of a free radical polymerization initiator and a polyamide stabilizer having a pendent amide group.

The invention also relates to mixtures of the polymer dispersions with compounds having two or more active hydrogen atoms as determined by the Zerewittinoff method. These mixtures are used to prepare polyurethane products.

The polymer dispersions are particularly useful because of their low viscosities and the presence of the chain extender. They are readily compatible with compounds containing two or more active hydrogen atoms. Consequently, their use in the preparation of polyurethane elastomers by reaction injection molding (RIM) is expected to offer advantages in processing.

DESCRIPTION OF THE PREFERRED EMBODIMENTS

As was mentioned, the polymer dispersions are prepared by the in situ polymerization of an ethylenically unsaturated monomer or mixture of monomers in a chain extender in the presence of a free radical polymerization initiator and a polyamide stabilizer having a pendent amide group. The polymerization may be carried out at a temperature between 40° C. and 160° C., preferably 100° C. to 125° C.

Ethylenially unsaturated monomers which can be used to prepare the polymer dispersions include butadiene, isoprene, 1,4-pentadiene, 1,5-hexadiene, 1,7-octadiene, styrene, alpha-methylstyrene, 4-methylstyrene, 2-methylstyrene, 3-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylamimostyrene, acetoxylstyrene, methyl-4-vinylbenzoate, phenoxystyrene, p-vinyldiphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl actate, vinyl chloroacetate, vinyl alcohol, vinyl butyrate, isopropenyl acetate, vinyl metacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxyl-2'-vinyloxy diethyl ether, vinyl 2-ethylmercaptoethyl ether, vinyl methyl ketone, vinyl ethyl ketone, vinyl phosphonates such as bis(betachloroethyl)vinyl-phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Preferably used are acrylonitrile, styrene, and mixtures thereof in weight ratios of acrylonitrile to styrene of 3:1 to 1:3.

The chain extenders which are used to prepare the dipersions have molecular weights of less than 400, preferably of 62 to 300, and preferably have 2 active hydrogen atoms. Examples of chain extenders include aliphatic and/or araliphatic diols having 2 to 14, preferably 2 to 6 carbon atoms such as ethylene glycol, 1,6-hexanediol and bis(2-hydroxyethyl)hydroquinone 1,10-decanediol, diethylene glycol, dipropylene glycol and preferably 1,4-butanediol.

Preferably used, however, are 1,4-butanediol and ethylene glycol, and other chain extenders in which the polyamide stabilizer is soluble. Generally, the weight percent of vinyl polymer is from 10 percent to 70 percent, preferably 40 percent to 50 percent based upon the total weight of the dispersion.

The stabilizer which is used to prepare the subject dispersions is a polyamide having a pendent amide group and an average molecular weight of about 5,000 to about 1,000,000, preferably from about 10,000 to about 60,000. Preferably used as the polyamide is poly(N-vinyl-2-pyrrolidone). However, other polyamides having a pendent amide group prepared by the vinyl polymerization of olefinically unsaturated monomers such as vinyl caprolactam, acrylamide, and methacrylamide may be used. These polyamides having a pendent amide group may also be prepared by other methods known to those skilled in the art. The amount of stabilizer used is such that the weight ratio of monomer to polyamide is from about 2:1 to about 100:1, preferably about 16:1.

Free radical polymerization initiators which can be used to carry out the polymerization reaction include, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, bis(triphenylmethyl)peroxide, bis(p-methoxybenzoyl)peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha,alpha'-azo-2-methyl butyronitrile, alpha,alpha'-azo-2-methyl heptonitrile, 1,1'-azo-1-cyclohexane carbonitrile, dimethyl alpha,alpha'-azoisobutyrate, 4,4'-azo-4-cyanopentanoic acid, azobis(isobutyronitrile), 1-t-amylazo-1-cyanocyclohexane, persuccinic acid, diisopropyl peroxy dicarbonate, 2-t-butylazo-2-cyano-4-methylpentane and the like; a mixture of catalysts may also be used. Azobis(isobutyronitrile) and 2-t-butylazo-2-cyano-4-methylpentane are the preferred catalysts. Generally, from about 0.5 percent to about 10 percent, preferably from about 1 percent to about 4 percent, by weight of catalyst based on the weight of the monomer will be employed in the process of the invention.

The resulting dispersions have low viscosities, generally less than 1700 cps at 25° C. This makes them particularly useful for processing by reaction injection molding techniques. The dispersions are preferably mixed with a compound having an average equivalent weight of 500 to 10,000 containing two or more active hydrogen atoms as determined by the Zerewitinoff method. Such mixtures appear to be homogeneous and maintain this appearance for at least two days. Examples of compounds which contain two or more active hyrogen atoms include, but are not limited to hydroxyl-terminated polyesters; polyoxyalkylenepolyether polyols; graft polyoxyalkylenepolyether polyols; alkylene oxide adducts of organic compounds having at least two reactive hydrogen atoms such as amines and thiols; and hydroxy terminated acetals. These compounds will now be more specifically described.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257-262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re. 28,715), 3,304,273, 3,652,639, and 3,823,201 (Re. 29,014), the disclosures of which are hereby incorporated by reference.

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-propanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

The mixture of polymer dispersion and compound containing at least two active hydrogen atoms is used to prepare polyurethane elastomers. In order to prepare polyurethane elastomers, the mixture is reacted with any conventional organic polyisocyanate, modified organic polyisocyanate, or quasi prepolymer, as well as mixtures thereof. Representative conventional organic polyisocyanates correspond to the following formula:

$$R''(NCO)_z$$

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein include, for example, aromatic diisocyanates such as 2,4-toluene diisocyanate, 2,6-toluene diisocyanate, mixtures of 2,4- and 2,6-toluene diisocyanate, crude toluene diisocyanate, 4,4'-diphenylmethane diisocyanate, 2,4'-diphenylmethane diisocyanate, mixtures of 4,4'- and 2,4'-diphenylmethane diisocyanate, polymethylene polyphenyl isocyanates, mixtures of diphenylmethane diisocyanates and polymethylene polyphenyl polyisocyanates, and the like; aromatic triisocyanates such as 4,4',4"-tri-phenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

As was mentioned, isocyanates which are modifications of the above isocyanates which contain carbodiimide, allophanate or isocyanurate structures may also be used. Quasi-prepolymers may also be employed. These quasiprepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasiprepolymers have a free isocyanate content of from 20 percent to 40 percent by weight.

In addition to the previously described ingredients, other ingredients such as surfactants, fillers, pigments, blowing agents, and catalysts can be included in the preparation of the polyurethane elastomers. These ingredients are usually added to the polyol before reaction with the organic isocyanate to form a resin component which is then reacted with the isocyanate component.

Surfactants which can be used include polyoxyalkylene derivaties of siloxane or the alkylene oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein include, for example, aluminum silicate, calcium silicate, magnesium silicate, calcium carbonate, barium sulfate, calcium sulfate, glass fibers, flaked glass, carbon black, and silica. The filler, if used, is normally present in an amount ranging from about 5 parts to 50 parts by weight per 100 parts of resin.

A pigment which can be used herein can be any conventional pigment heretofor disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

Conventional blowing agents such as halohydrocarbons, hydrocarbons and the like, can be employed herein in their conventional mode. Representative examples include halogenated hydrocarbons such as monochlorodifluoromethane, dichloromonofluoromethane, dichlorodifluoromethane, and trichlorofluoromethane, and hydrocarbons such as propane and isobutane.

Any of the catalysts employed in the preparation of polyurethane foam can be employed in the subject invention. Representative of these catalysts include the tertiary amine catalysts such as diethylenetriamine, ketimine, tetramethylenediamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)-dodecyl succinate, phenylmercuric benzoate, cadmium naphthenate, dibutyltin dilaurate and dibutyltin-di-2-ethylhexanoate. Generally these catalysts will be employed in amounts ranging from about 0.01 part to 7.5 parts by weight based on the weight of the compound having an average molecular weight of 1000 to 8000 containing two or more active hydrogen atoms.

In general, the polyurethane elastomers of the present invention are prepared by mixing together the ingredients mechanically and/or by the use of high pressure machinery. The ratio of ingredients is such that from 0.7 equivalent to 1.4 equivalents of isocyanate is present per equivalent of active hydrogen contained in the active hydrogen containing compound having a molecular weight of 1000 to 8000 and the chain extender. Preferably from 0.9 equivalent to 1.15 equivalents of isocyanate is present per equivalent of active hydrogen atom. As was previously mentioned, the polyol compositions described herein for the preparation of polyurethane-polyurea elastomers are particularly useful for the preparation of molded products by reaction injection molding techniques.

The Examples which follow will illustrate in more detail the practice of this invention. They are not intended to limit the scope of its application. The parts referred to in the Examples are by weight unless otherwise specified, and the temperatures are in degrees centigrade unless otherwise specified. The following abbreviations will be used in the examples which follows:

| | |
|---|---|
| AN | acrylonitrile |
| BDO | 1,4-butanediol |
| DABCO 33LV | 33 percent by weight of triethylene diamine in dipropylene glycol, a catalyst. |
| PVP | polyvinyl pyrolidone having an average molecular weight of 40,000 unless otherwise stated. |
| STY | styrene |
| Polymerization initiator | 2-t-butylazo-2-cyanobutane |
| Isocyanate No. 1 | a mixture of quasi-prepolymer based upon pure MDI having a free NCO content of 25 percent by weight |
| T-12 | dibutyltin dilaurate, a catalyst |
| Polyol A | a polyoxyalkylene polyether polyol having an average molecular weight of 5140 prepared by the oxyalkylation of trimethylolpropane |
| Polyol B | a polyoxyalkylene polyether polyol having an average molecular weight of 4146 prepared by the oxyalkylation of glycerin. |

EXAMPLE 1

Into a four-neck reaction vessel equipped with a stirrer, thermometer, nitrogen inlet, water cooled condenser, and inlet tube was charged 825 parts of 1,4-butanediol and 75 parts of PVP. The mixture was heated to 115° C. A stream consisting of 600 parts of acrylonitrile and 600 parts of styrene were then added to the vessel along with another stream consisting of 900 parts of 1,4-butanediol and 24 parts of 2-t-butylazo-2-cyanobutane. The monomers were added over 4 hours while the BDO-polymerization initiator mixture was added over 4 hours, 10 minutes. The reaction time was 30 minutes and the stirrer was operated at 300 rpm.

After completion of the reaction, the reaction mixture was vacuum stripped for 45 minutes at 80° C. and 1 mm Hg. The white dispersion had a Brookfield viscosity (25° C.) of 1580 cps (39.1 percent vinyl polymer content).

EXAMPLES 2–17

Examples 2–17 were prepared in a manner similar to Example 1. The specific ingredients and other variables along with the Brookfield viscosity are set forth in Table I which follows.

TABLE I

| Example | PVP Charge | BDO, p. Charge | BDO, p. Feed | AN, p. | STY, p. | Catalyst p. | Reaction Temp. °C. | Monomer Addn. Time min. | Stripping Loss, p. | Viscosity cps./25° C. |
|---|---|---|---|---|---|---|---|---|---|---|
| 2 | 40 | 140 | 180 | 120 | 120 | 4.8 | 115 | 180 | 15.6 | 6540 |
| 3 | 24 | 156 | 180 | 120 | 120 | 4.8 | 115 | 180 | 15.2 | 2740 |
| 4 | 15 | 165 | 180 | 120 | 120 | 4.8 | 115 | 180 | 15.3 | 1400 |
| 5 | 15 | 165 | 180 | 120 | 120 | 4.8 | 120 | 180 | 21.6 | 1560 |
| 6 | 10 | 170 | 180 | 120 | 120 | 4.8 | 115 | 180 | 13.3 | 1020 |
| 7 | 15 | 165 | 180 | 120 | 120 | 4.8 | 115 | 240 | 13.7 | 1500 |
| 8 | 15 | 165 | 180 | 120 | 120 | 8.8 | 115 | 165 | 18.2 | 1600 |
| 9 | 15 | 165 | 180 | 60 | 180 | 4.8 | 115 | 185 | 7.0 | 1400 |
| 10 | 15 | 165 | 180 | 160 | 80 | 4.8 | 115 | 180 | 19.8 | 1450 |
| 11 | 15 | 165 | 180 | 80 | 160 | 4.8 | 115 | 180 | 13.9 | 1630 |
| 12 | 15 | 165 | 180 | 180 | 60 | 4.8 | 115 | 180 | 19.0 | 1170 |
| 13 | 12 | 168 | 180 | 120 | 120 | 4.8 | 115 | 240 | 16.6 | 1140 |
| 14 | 75 | 825 | 900 | 600 | 600 | 24.0 | 115 | 240 | 47.8 | 1580 |

TABLE I-continued

| Example | PVP Charge | BDO Charge | BDO Feed | AN, p. | STY, p. | Catalyst p. | Reaction Temp. °C. | Monomer Addn. Time min. | Stripping Loss, p. | Viscosity cps./25° C. |
|---|---|---|---|---|---|---|---|---|---|---|
| 15 | 15[a] | 165 | 180 | 120 | 120 | 4.8 | 115 | 180 | 13.8 | 850 |
| 16 | 15 | 165 | 180 | 120 | 120 | 4.8 | 115 | 180 | 14.8 | 1570 |
| 17 | 15 | 165[b] | 180 | 120 | 120 | 4.8 | 115 | 180 | 52.2 | 870 |

[a] PVP, 10,000 MW
[b] Ethylene glycol

EXAMPLE 18

A polyurethane plaque was prepared as a prototype of a microcellular reaction injection molded foam. The foam was prepared in a 10"×10"×⅛" mold which was cleaned, dried and heated to 145° F. in an oven (temperature of mold checked with infrared thermometer). A mold release agent was sprayed on the hot mold before the addition of hand-mixed material.

The resin side of the microcellular foam including polyol, BDO dispersion, amine catalyst and tin catalyst were mixed at high speed for 60 seconds, allowed to stand for 60 seconds and then the required amount of isocyanate was added. The mixture was stirred for 5 to 10 seconds, added to the hot mold and closed. The mold was opened 2 minutes later and the plaque removed. The plaques were further cured at 120° C. for 30 minutes. The specific ingredients and the properties of the resulting plaque are shown in Table II which follows.

TABLE II

| | Parts |
|---|---|
| Formulation | |
| Polyol A | 45.2 |
| Polyol B | 45.2 |
| BDO of Example 14 | 59.4 |
| DABCO 33LV | 1.8 |
| T-12 | 0.05 |
| Isocyanate No. 1* | 158 |
| Index | 105 |
| Physical properties** | |
| Density, pcf | 54.1 |
| Tensile strength, psi | 1480 |
| Elongation, % | 20 |
| Graves Tear, pi | 266 |
| Hardness Shore D | 53 |
| Heat sag, 250° F. | 0.56 |

*Insufficient isocyanate may have been used due to container losses.
**Sample was postcured 30 minutes at 120° C.

The embodiments of the invention in which an exclusive privilege or property is claimed are defined as follows:

1. A process for preparing a polyurethane elastomer comprising reacting a mixture of (a) a polymer dispersion prepared by the in situ polymerization of about 10 percent to about 70 percent by weight based upon the total weight of the dispersion of an ethylenically unsaturated monomer or mixture of monomers in a chain extender of a molecular weight of 62 to less than 400 selected from the group consisting of aliphatic and/or araliphatic diols having 2 to 14 carbon atoms in the presence of a free radical polymerization initiator and a polyamide stabilizer having a pendent amide group said polyamide having an average molecular weight of from about 5,000 to about 1,000,000, wherein the weight ratio of the monomer to the polyamide is from about 2:1 to about 100:1; and (b) a compound containing two or more active hydrogen atoms as determined by the Zerewitinoff method with a molecular weight of 1000 to 8000 with an organic polyisocyanate.

2. The process of claim 1 wherein (b) is selected from the group consisting of polyoxyalkylene polyols and graft polyoxyalkylene polyols.

3. The process of claim 1 wherein the polyamide has an average molecular weight of 10,000 to 60,000.

4. The process of claim 1 wherein the polyamide is poly(N-vinyl-2-pyrrolidone).

5. The process of claim 1 wherein the chain extender is selected from the group consisting of 1,4-butanediol and ethylene glycol.

6. The process of claim 1 wherein the monomer is a mixture of acrylonitrile and styrene.

* * * * *